United States Patent [19]

Broberg et al.

[11] Patent Number: 4,671,926
[45] Date of Patent: Jun. 9, 1987

[54] FUEL ASSEMBLY FOR A NUCLEAR REACTOR

[75] Inventors: Arne Broberg; Ragnar Mansson, both of Västerås, Sweden

[73] Assignee: AB Asea-Atom, Vasteras, Sweden

[21] Appl. No.: 664,290

[22] Filed: Oct. 24, 1984

[30] Foreign Application Priority Data

Nov. 30, 1983 [SE] Sweden ................. 8306599

[51] Int. Cl.⁴ ............................................. G21C 15/00
[52] U.S. Cl. .................................... 376/364; 376/178;
376/443; 376/445; 376/446
[58] Field of Search ............... 376/362, 364, 178, 445,
376/446, 448, 443

[56] References Cited

U.S. PATENT DOCUMENTS 3,878,042  4/1975  Curulla .......................... 376/446
4,119,489 10/1978  Itoh ............................... 376/445
4,219,386  8/1980  Osborne ......................... 376/446
4,304,635 12/1981  Lippert .......................... 376/448
4,563,328  1/1986  Steinke .......................... 376/446

Primary Examiner—Donald P. Walsh
Attorney, Agent, or Firm—Pollock, Vande Sande & Priddy

[57] ABSTRACT

A fuel assembly for a boiling water reactor has a bundle of fuel rods consisting of a top tie plate and a bottom part which, together with a plurality of fuel rods, constitutes a rigid unit. The fuel rod bundle is surrounded by a fuel channel (1), to which there is attached a fixing member (2) cast in stainless steel. The fixing member (2) is attached to a vertical projection (3), extending from the top tie plate, by means of a bolt (4) which is loaded with a tensile force and a sleeve (10) which is loaded with a compressive force and which surrounds the bolt and is arranged in the fixing member, the coefficients of thermal expansion of the bolt and the sleeve being less than that of the fixing member.

9 Claims, 15 Drawing Figures

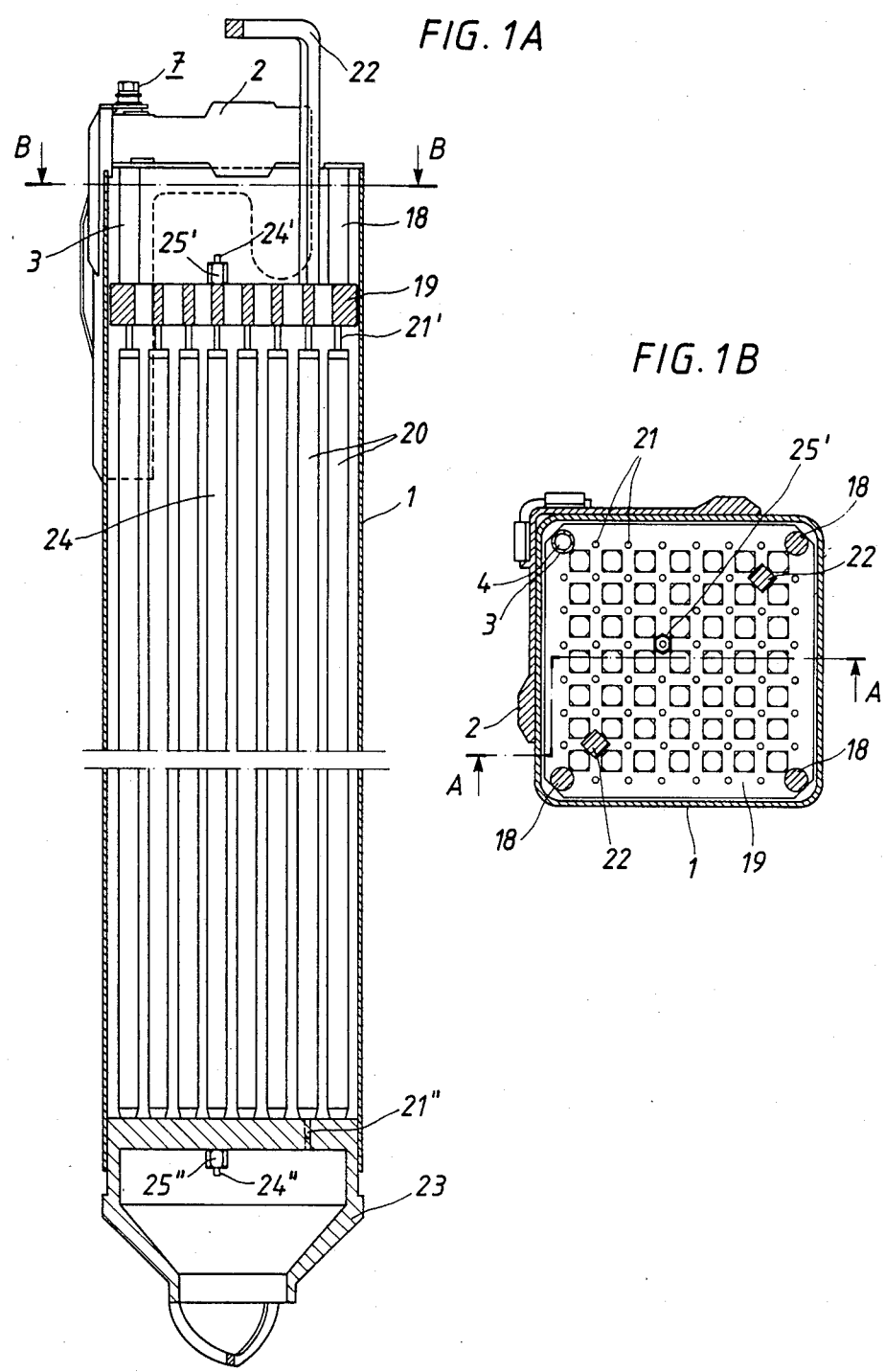

FUEL ASSEMBLY FOR A NUCLEAR REACTOR

TECHNICAL FIELD

The present invention relates to a nuclear fuel assembly comprising a plurality of vertical fuel rods, a top tie plate which is arranged at the upper ends of the fuel rods, a fuel channel made with approximately square cross-section and surrounding said fuel rods and said top tie plate, and a fixing member of stainless steel attached to the fuel channel.

PRIOR ART

The top tie plate has a vertical, upwardly-extending projection provided in a corner portion of said fuel channel and being arranged in a tensile force-transmitting connection with said fixing member via a vertical bolt which is passed through a through-hole provided in said fixing member. The bolt is made of a material whose coefficient of thermal expansion is less than the coefficient of thermal expansion of said stainless steel.

DISCLOSURE OF THE INVENTION

The task which is to be solved through the invention is the provision of a fuel assembly of the initially mentioned type in such a way that the probability of rupture in the above-mentioned bolt is considerably reduced. According to the invention, the bolt is surrounded by a metallic sleeve which is arranged to be loaded with a compressive force corresponding to a major part of the tensile force acting on said bolt, said sleeve being made of a metallic material whose coefficient of thermal expansion is smaller than the coefficient of thermal expansion of said stainless steel.

BRIEF DESCRIPTION OF DRAWINGS

In the following the invention will be described with reference to the accompanying drawings, wherein FIG. 1A shows a fuel assembly according to a first embodiment of the invention in vertical section along A—A on FIG. 1B;

FIG. 1B shows a horizontal section along B—B on FIG. 1A;

DESCRIPTION OF PREFERRED EMBODIMENT

Figure 1C:
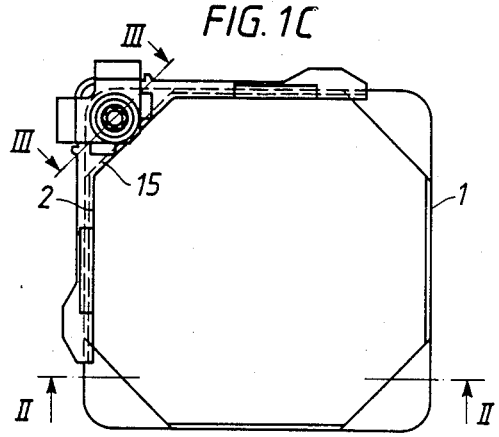
FIG. 1C shows the same fuel assembly in view from above.

In the drawings, 1 designates a fuel channel with approximately square cross-section. The fuel channel 1 is made of a zirconium alloy, for example Zircaloy II$^R$, and surrounds a bottom portion 23, a top tie plate 19 and a plurality of vertical fuel rods 20 and 24, which together with the above-mentioned components are included in a fuel assembly for a boiling reactor. A minority of the fuel rods are made as tie rods 24 having upper end taps 24' and lower end taps 24" and corresponding nuts 25' and 25", respectively. The fuel rods 21 have upper end taps 21' and lower end taps 21". The top tie plate 19, the bottom tie plate 23 and the fuel rods are interconnected with each other into a bundle which may be lifted by means a lifting force applied to a lifting handle 22 attached to the top tie plate. The fuel channel is attached to said bundle by means of a fixing device and can thus be lifted in the same lifting operation as the other components of the fuel assembly. The fixing device comprises a fixing member 2, which is cast in stainless steel and formed with an upper portion having a substantially L-shaped cross section. The fixing body is resting on the upper edge of the fuel channel, being fixed thereto by means of a plurality of snap connections. The top tie plate 19 has four upwardly-directed projections, which are located at corresponding corners of the fuel channel and which, similar to the rest of the top tie plate, are made of the same material as the fixing member 2. One of these projections is designated by the reference numeral 3, the remaining ones by the reference numeral 18. The fixing member is fixed to the projection 3 by means of a tensile force-transmitting bolt 4 with a threaded portion 5 which is screwed into a threaded vertical bore 6 of the projection 3. The threaded portion 5 has a larger diameter than the tensile force-loaded portion of the bolt 4 positioned above the portion 5. The bolt 4 has a bolt head 7 with a varying circular cross section. A spring 8 is suspended from the bolt head 7. A lower portion of the bolt head 7 is arranged — with a play — in a through-going, vertical bore 9 in the fixing member 2, said bore 9 also containing a circular sleeve 10 surrounding the bolt 4 and a spring washer 11 clamped between the bolt head 7 and the sleeve 10, said spring washer being made of the same material as the bolt 4. A metallic ring 12, arranged in an annular slot in the bore 9, prevents the bolt 4 from leaving the fixing member 2 when the fuel channel is dismantled. The bore 9 has an upper circular-cylindrical part, the diameter of which is somewhat larger than the diameter of a lower circular-cylindrical part, positioned immediately below said upper circular-cylindrical part. Thus, an annular, upwardly-directed contact surface positioned in a horizontal plane is formed. The sleeve 10 makes contact with said surface with a corresponding, downwardly-directed contact surface. At the upper and lower end, the sleeve 10 has a plurality of radial channels 13 and 14, respectively. At room temperature and when the bolt is tightened, the sleeve 10 transmits a compressive force to the projection 3 via a substantially triangular sheet body 15, made of the same material as the fuel channel and being welded thereto, the bolt 4 being loaded with an equally great tensile force. The bolt 4 is made of a steel alloy with a very high nickel content and has a coefficient of thermal expansion which is considerably smaller than the coefficient of thermal expansion of the material used for the fixing member 2 and the projection 3, usually at least 20% smaller. The sleeve 10 is made of the same material as the bolt 4, or alternatively of a material with a smaller coefficient of thermal expansion. The sleeve 10 has a vertical extension which constitutes at least 40%, preferably at least 60% of the total extension of that part of the bolt 4 which is loaded with a constant tensile force.

Upon heating of the fuel assembly to operating temperature, consequently the play C is considerably diminished, however without being reduced to zero.

If the sleeve 10 had been made of the same material as the fixing member 2, the difference in thermal expansion would have resulted in a dangerous increase of the tensile force acting on the bolt 4. Because the sleeve 10 has a coefficient of thermal expansion which is equal to or smaller than the coefficient of thermal expansion of the bolt material, instead an acceptable increase of the tensile force acting on the bolt 4 is obtained, or no increase at all.

Between the bolt 4 and the sleeve 10 there is a hollow-cylindrical gap 16. Water is supplied to the gap 16 via the channels 14 and leaves the gap via the channels 13, which communicate with a plurality of horizontal outlet channels 17 extending through the fixing member 2. In this way a permanent renewal of the water present in the gap 16 is obtained. Since stationary water is generally considered to be a necessary condition for stress corrosion, the probability of stress corrosion occurring in the bolt 4 is thus reduced.

Figure 3:
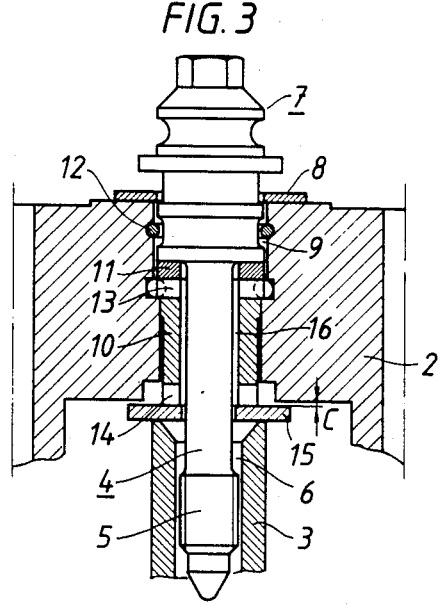
FIG. 3 shows a partial vertical section along III—III in FIG. 1.
Figure 2:
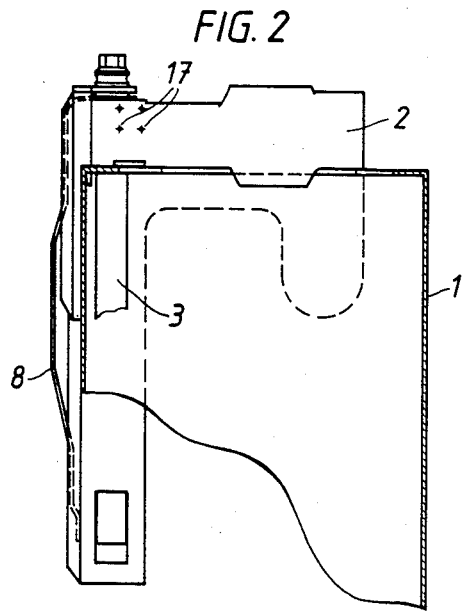
FIG. 2 shows a partial vertical section along II—II in FIG. 1.
Figure 4:
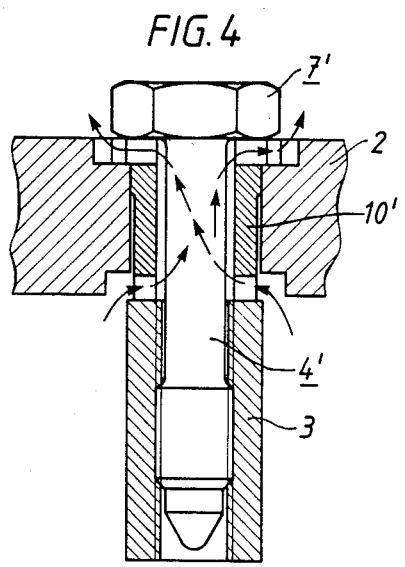
FIG. 4 shows in partial vertical section a second embodiment, which deviates from that shown in FIG. 3 by the fact that the above-mentioned bolt is formed with a somewhat different shape. The position of the vertical section in relation to the fuel assembly is the same as for section III—III.
Figure 5:
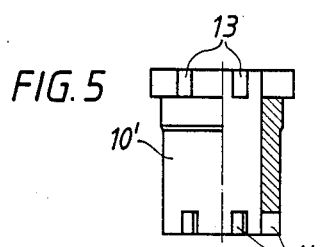
FIG. 5 shows a sleeve (shown in FIG. 4) surrounding the bolt, in side view and in vertical section.
Figure 6:
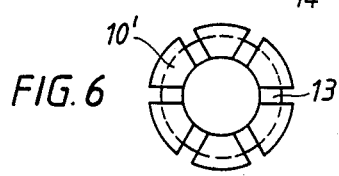
FIG. 6 shows the sleeve shown in FIG. 5 in a view from above.
Figure 7:
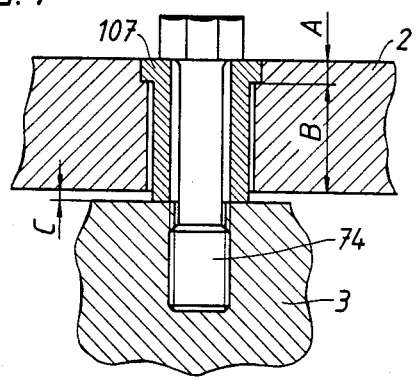
FIGS. 7-13 show in vertical sections seven different alternatives to the arrangement shown in FIG. 4.
Figure 8:
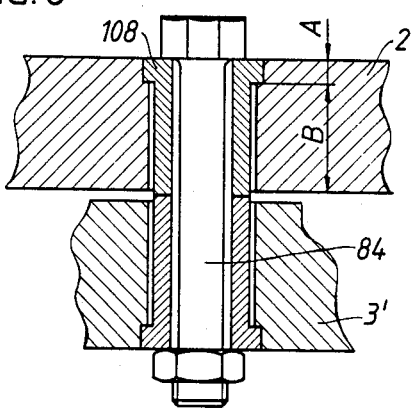
Figure 9:
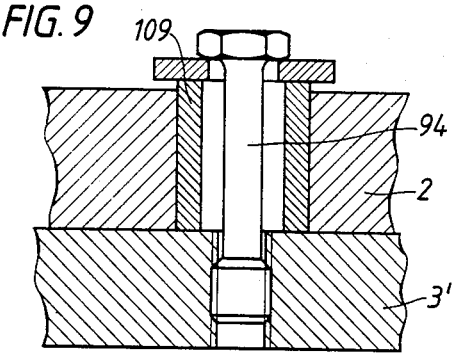
Figure 10:
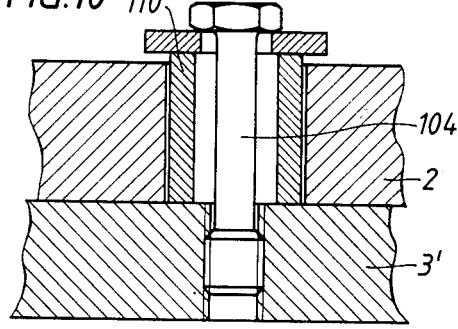
Figure 11:
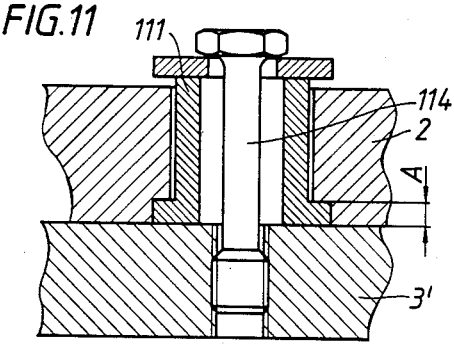
Figure 12:
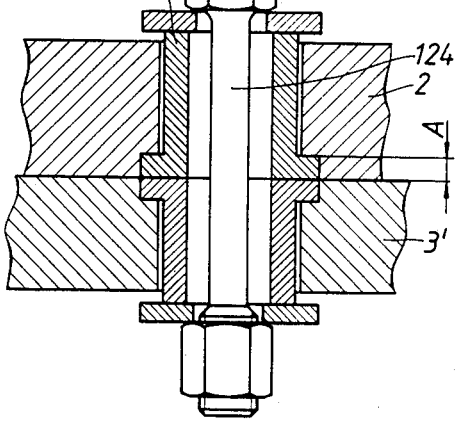

The arrangement shown in FIGS. 4, 5 and 6 differs from that shown in FIG. 3 in that the bolt head 7' has a conventional shape, in that the sleeve 10' has the same vertical dimension as the bore in which it is arranged and in that the outlet channels 17 have been replaced by upwardly-directed openings.

In FIGS. 7–12 the bolts 74, 84, 94, 104, 114, 124 and the sleeves 107, 108, 109, 110, 111 and 112 are made of the same material as the bolt 4 described above. The sleeves 107, 108, 111 and 112 are arranged with a press fit along a distance A, whereas the sleeve 109 is arranged with a press fit and the sleeve 110 with a play along the entire length of the sleeve.

In some of the shown variants, the top tie plate has a projection 3' which differs from the projection 3 in that its uppermost portion is formed in a different way.

Figure 13:
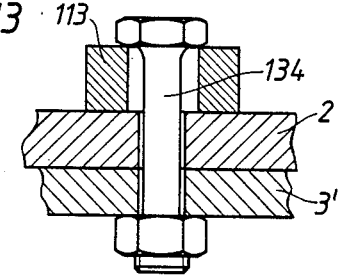

In the arrangement shown in FIG. 13, the bolt 134 is made of the same material as the bolt 4 described above, whereas the coefficient of thermal expansion for the projection 3' extending from the top tie plate is the same as for the fixing member 2. If the coefficients of thermal expansion of parts 113, 134 and 2 are designated $k_{113}$, $k_{134}$ and $k_2$, respectively, then $k_{113}$ is considerably smaller than $k_{134}$. More particularly, the difference $k_2 - k_{134}$ is considerably smaller than the difference $k_{134} - k_{113}$.

What is claimed is:

1. A nuclear fuel assembly comprising a plurality of vertical fuel rods, a top tie plate arranged at the upper ends of the fuel rods, a fuel channel formed with approximately square cross-section and surrounding said fuel rods and said top tie plate, and a fixing member of stainless steel fixed to the fuel channel, said top tie plate having a vertical, upwardly-directed projection disposed in a corner portion of said fuel channel and arranged in a tensile force-transmitting mechanical connection with said fixing member via a vertical bolt which is passed through a through-hole provided in said fixing member, said bolt being made of a material whose coefficient of thermal expansion is smaller than the coefficient of thermal expansion of said stainless steel, and wherein said bolt is surrounded by a sleeve means comprising a metallic sleeve member, a first engaging means for compressive engagement between said sleeve member and said fixing member, a second engaging means for compressive engagement between said sleeve member and said projection, and a third engaging means for compressive engagement between said sleeve member and said bolt, said second and third engaging means providing substantially no play between said bolt, said sleeve member and said projection, and said first engaging means providing such play between said fixing member and said projection that said metallic sleeve which is loaded with a compressive force corresponding to a major part of the tensile force acting on said bolt, said sleeve being made of a metallic material whose coefficient of thermal expansion is smaller than the coefficient of thermal expansion of said stainless steel.

2. Fuel assembly according to claim 1, in which said sleeve and said bolt are made of the same material.

3. Fuel assembly according to one of the preceding claims, in which said sleeve is arranged in said through-hole provided in said fixing portion.

4. Fuel assembly according to claim 1, in which said sleeve has a vertical extension which constitutes at least 40% of the vertical extension of a part of said bolt which is loaded with a constant tensile force.

5. A fuel assembly according to claim 1, in which said sleeve has a vertical extension which constitutes at least 60% of the vertical extension of a part of said bolt which is loaded with a constant tensile force.

6. A fuel assembly according to claim 1, in which the coefficient of thermal expansion of said sleeve is equal to or smaller than the coefficient of thermal expansion of said bolt.

7. A fuel assembly according to claim 1, in which the play between said fixing member and said projection comprises a gap that is not reduced to 0 upon heating the fuel assembly to operating temperature.

8. A fuel assembly according to claim 1, in which the thermal expansion coefficient of said bolt is less than a thermal expansion coefficient of said fixing member and the thermal expansion coefficient of said sleeve is less than the thermal expansion coefficient of said bolt, and in which the difference between the coefficients of said bolt and said fixing member is substantially smaller than the difference between the coefficients of said sleeve and said bolt.

9. A fuel assembly according to claim 8, in which there is substantially no gap between said fixing member and said projection.

* * * * *